June 16, 1942.  R. G. A. WEISS ET AL  2,286,397
APPARATUS FOR TREATING SETTLED SOLIDS IN LIQUID-SOLIDS MIXTURES
Filed July 7, 1939  8 Sheets-Sheet 4

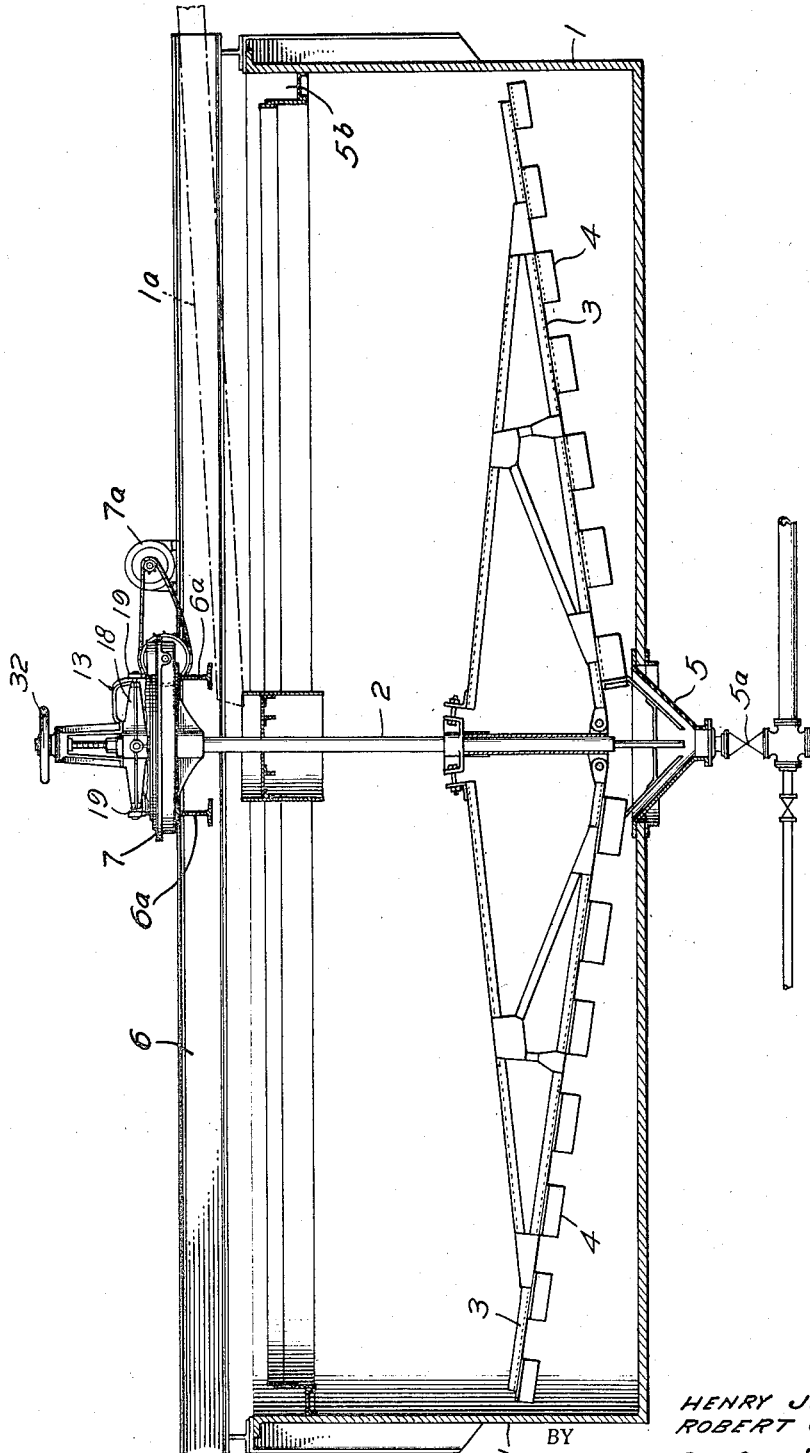

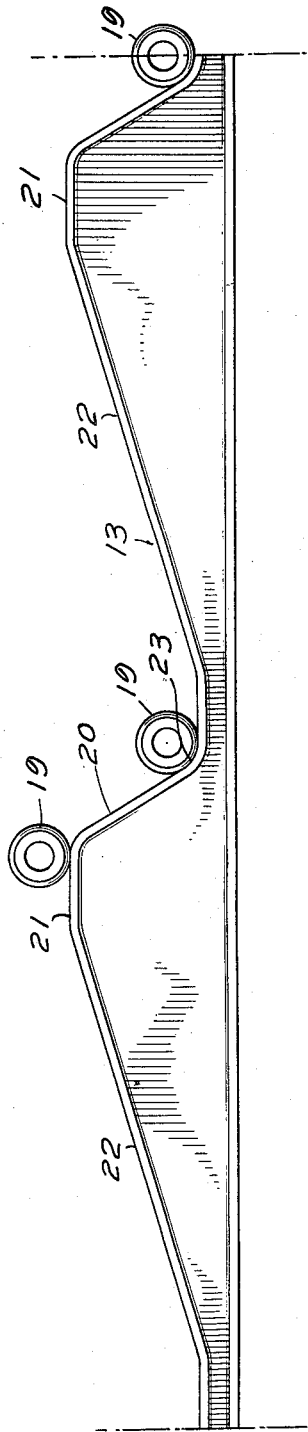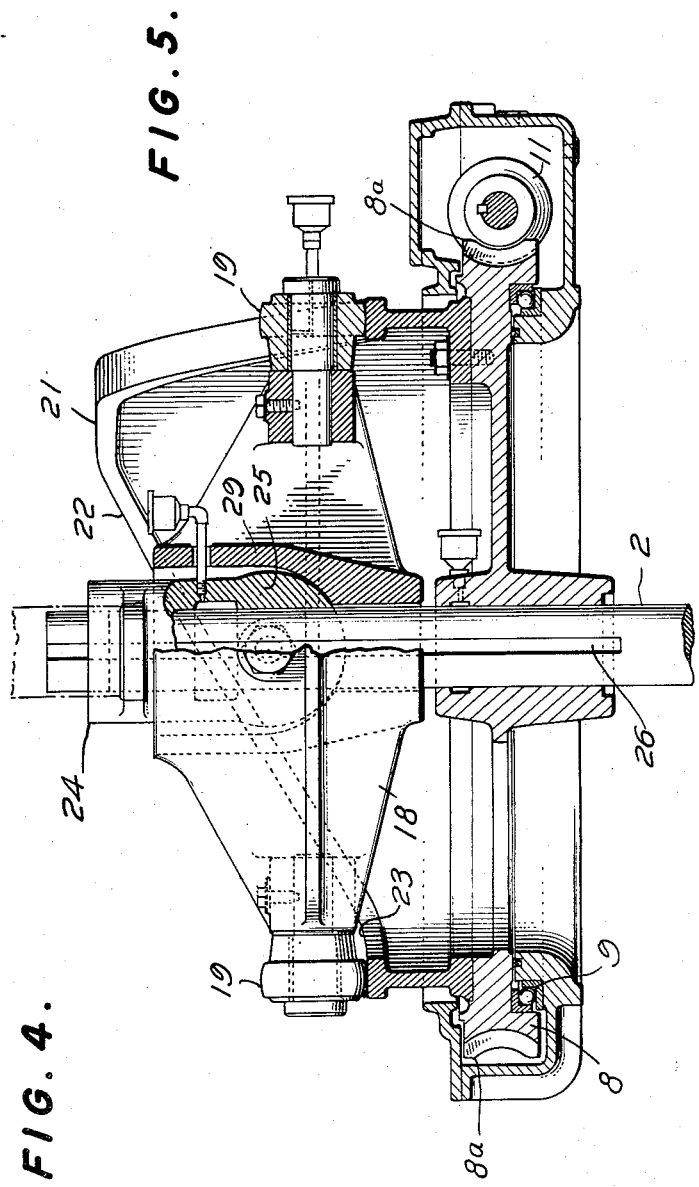

INVENTORS,
HENRY J. TALBOT,
BY ROBERT G. A. WEISS,
Austin Middleton
ATTORNEY.

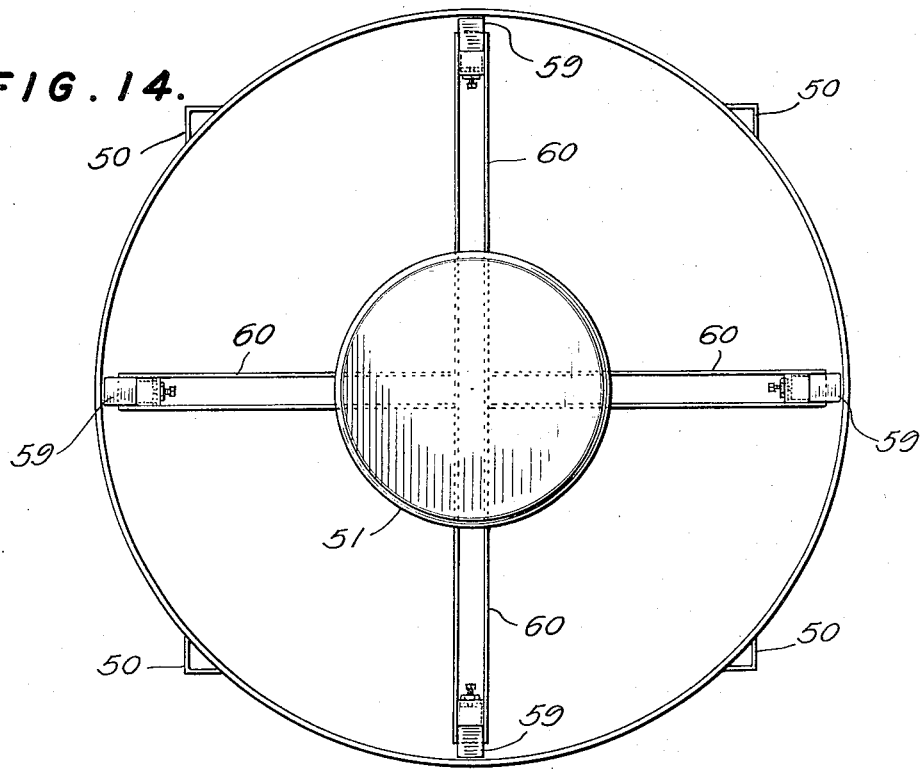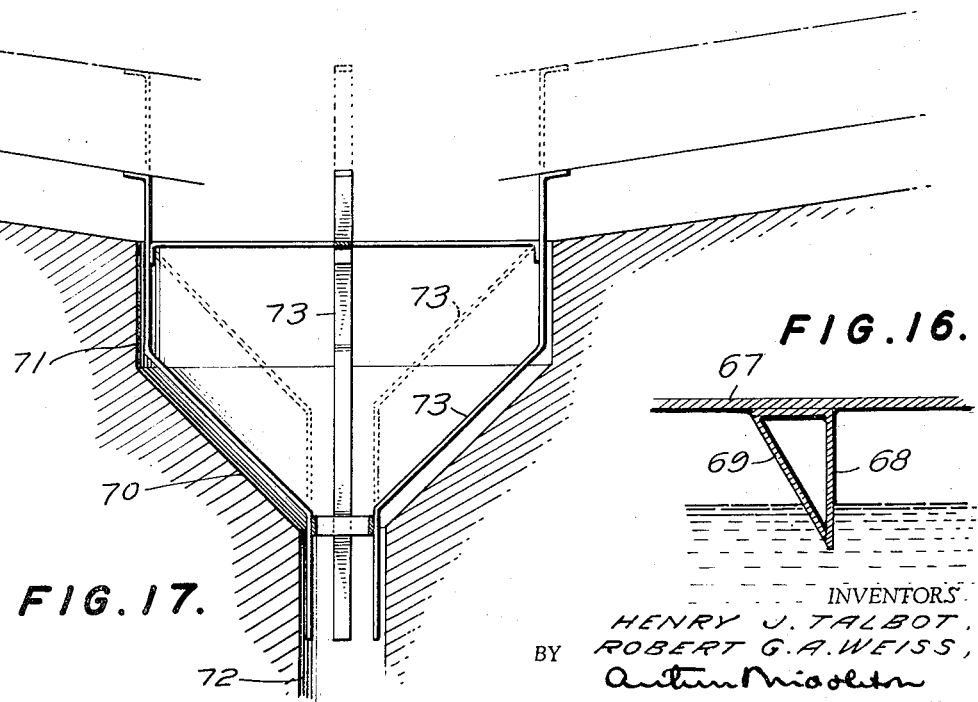

Patented June 16, 1942

2,286,397

UNITED STATES PATENT OFFICE 2,286,397

APPARATUS FOR TREATING SETTLED SOLIDS IN LIQUID-SOLIDS MIXTURES

Robert George Albert Weiss and Henry John Talbot, The Hague, Netherlands, assignors to The Dorr Company Inc., New York, N. Y., a corporation of Delaware Application July 7, 1939, Serial No. 283,180
In Great Britain July 7, 1938

5 Claims. (Cl. 210—55)

This invention relates to apparatus for treating settled solids in liquid-solids mixtures as for example stirring and thickening for sedimentation apparatus of the kind in which revolving devices such as rakes, stirrers or like members hereinafter called rakes are caused to traverse the settled material or the mixture for the purpose of the treatment.

The invention may be applied with particular advantage to sedimentation apparatus employing revolving rakes which are adapted to displace settled material as towards a discharge while concurrently causing a thickening or concentrating of the material by their passage therethrough.

The general object of the invention is to provide improved means for dealing with overloads in apparatus of the above character such as may be caused by undue accumulation of solid material or by some change in its physical properties which so increases the resistance of the movement of the immersed rakes that the driving motor is brought to rest, or breakage or slip occurs in the transmission. Previous proposals have been made for automatically raising the rakes or other members as the resistance increases by employing in the drive a pair of members acting on the principle of the screw and nut, and utilizing the relative displacement which occurs upon increase in load to lifting the rakes. Examples of arrangements operating on this principle are shown in British patent specifications Nos. 417,595 and 406,021.

It is an object of the invention to obviate any possibility of overstraining the drive mechanism even under abnormal increase in the load and to provide an overload protective device which is not liable to be tampered with as are the usual automatic cut-out devices provided on the driving motor.

A further object is to provide an arrangement which enables excessive accumulations of solid material to be removed automatically. A further object is to provide an improved construction of the rake lifting mechanism which affords a balanced drive without the necessity for exceedingly accurate machining of the parts.

A further object is to provide an automatic rake lifting arrangement in which the usual electrical overload protective device may be dispensed with.

A further object is to prevent clogging of the outlet from the tank irrespective of the vertical position of the rakes.

According to the invention revolving devices such as rakes in an apparatus of the character described are driven through engaging members formed to permit relative rotation and displacement of the members upon an increase in the driving resistance for alternately raising and permitting the lowering of the rakes as the rotation continues.

The invention also consists in an apparatus of the character described in which the drive of the revolving devices or rakes is effected through a rotatable member having a continuous humped cam surface, the slope of the hump or humps being arranged so that when the driving torque reaches a predetermined value the cam follower will ride up the slope and thereby raise the revolving devices, and the cam surfaces comprise a reverse slope permitting the said devices to return under their own weight. The return surface of the cam preferably affords a gentle slope as compared with the rake lifting or driving slope, and may also include a portion of zero slope, i. e. a surface which neither raises the rakes nor permits them to descend.

According to a further feature of the invention the rakes are suspended by sliding or rolling engagement means from a rotatable cam member having an annular humped cam surface. Preferably the cam member has two or more humps and the lifting and driving slopes thereof are arranged to engage simultaneously with two or more of the suspension means. The slope of the lifting surfaces may be constant in which case the transmitted torque is also constant, or the slope may progressively increase as described in British patent specification No. 406,021 which affords a progressively increasing transmitted torque as the revolving devices are raised. Preferably the slope is made to correspond with the maximum permissible driving torque so that the revolving devices or rakes commence to rise when the resistance corresponds to this torque value.

According to a further feature of the invention means is provided for ensuring the transmission of a balanced drive to the rake carrying driven member. This is effected according to the invention by providing an annular cam member having two or more humps engaged by a driven member pivotally mounted upon a shaft carrying the revolving devices or rakes and movable about a horizontal axis. Thus the vertical rake shaft may have a double-armed spider pivoted thereon, the arms carrying rollers which engage and are supported by the annular humped cam member, which is itself rotatably supported upon the fixed structure of the apparatus and is driven by any convenient means.

In one convenient arrangement the annular cam member is mounted upon a horizontal gear wheel to which the drive is transmitted by a worm meshing therewith. In a preferred arrangement a vertical shaft carrying the revolving devices or rakes has secured thereto a sleeve having downwardly directed semi-circular portions seated within trough-like recesses formed in a double-armed spider. The ends of the said arms carry rollers which are arranged to run upon the annular humped cam member and this construction accordingly provides for a limited pivotal movement of the spider about an axis perpendicular to the shaft.

According to a further feature of the invention there is included in the drive mechanism for the revolving devices or rakes a mechanical overload release which interrupts the drive when the transmitted torque exceeds a maximum permissible value. In a convenient arrangement according to the invention the drive is effected through a pair of interengaging members having clutch-like surfaces held in driving engagement by spring means and arranged so that when the transmitted torque exceeds a predetermined value, the spring means will be compressed and allow the clutch parts to separate and interrupt the drive. Thus in one form a vertical shaft carrying the revolving devices or rakes has keyed thereto a clutch member vertically slidable against the spring and engaged with a second clutch member mounted upon a spider which is supported and driven from an annular humped cam member. In this arrangement the spring which holds the clutch members in drive transmitting engagement also takes the weight of the rake mechanism and the arrangement is such that when the resistance opposed to upward movement of the rakes becomes excessive, e. g. if the rakes become embedded in heavy sand, the spring will be compressed and the clutch parts will separate, thereby relieving the drive and preventing the transmission from being overstressed. In another form of the overload protection the drive to the rake driving and lifting cam is effected through interengaging spring pressed members which are arranged to relieve and interrupt the drive when the transmitted torque exceeds the permissible value. In one form of this construction the annular humped cam member from which the revolving devices are suspended is rotatably mounted upon its driving means which may for example comprise a gear wheel, and is driven therefrom by interengaging means which are adapted to be released automatically when the transmitted torque exceeds a predetermined value. The said interengaging means may comprise shallow projections on the cam member engaged by pivoted spring-pressed fingers on the gear wheel.

The invention may also be applied to sedimentation apparatus in which the revolving devices or rakes are carried by a cage structure suspended from an driven by an annular humped cam member which is rotatably mounted upon a central pier. In this arrangement guide means may be provided to prevent tilting of the cage structure.

According to a further feature of the invention there may also be provided manually operated means for lifting the devices or rakes independently of the automatic lifting mechanism.

According to a further feature of the invention the revolving rake devices comprise blade elements having surfaces inclined to the vertical so that when permitted to descend freely into the accumulated solids they tend to move in the direction of their normal travel. Thus for example the blades may be of triangular cross section comprising a substantially vertical and an inclined face.

According to a further feature of the invention means is provided for retarding or cushioning the descent of the rakes when such is permitted by the operation of the drive. Such means may comprise for example one or more hydraulic rams operating in cylinders arranged so that the descent of the revolving devices causes the liquid to be forced out of the cylinders through a small orifice.

The invention also consists in apparatus of the character described having revolving devices or rakes which are capable of vertical movement and are arranged to displace settled material towards a discharge sump, and including scraper means operative within the sump, parts of the sump and of the scraper means being disposed so that their relative position remains unchanged through the raising and lowering movement of the revolving devices. This may be effected by forming the discharge sump with one or more portions of constant cross-section disposed parallel to the axis of the revolving devices, the depth of said portions being at least as great as the maximum possible lift of said devices and the scraping elements being disposed parallel to said portion or portions. Preferably the sump comprises a conical portion having an upper cylindrical extension and a lower cylindrical extension portion of smaller cross-section, and the scraper means comprise elements which lie adjacent to said portions when the revolving devices occupy their lowermost position.

The invention will be better understood upon consideration of the following examples applied to sedimentation tanks or thickeners for separating solids from liquids and which may be used for dealing with industrial pulps, sewage and many kinds of liquid-solids mixtures as illustrated in the accompanying drawings, in which:

Figure 1 is an elevation partly in section of a thickening apparatus for sewage or other sludges or pulps constructed in accordance with the invention;

Figure 4 is a diagram showing the developed form of the driving cam;

Figure 5 is an elevation partly in section of a modified form of supporting and driving mechanism for the rakes;

Figure 14 is a section taken on the line 14—14 of Figure 13;

Figure 16 is a sectional view of a rake blade constructed in accordance with the invention, mounted upon the rake arm;

Figure 17 is a section of a central discharge outlet constructed in accordance with the invention, showing the scraper operative therein.

Figure 3:
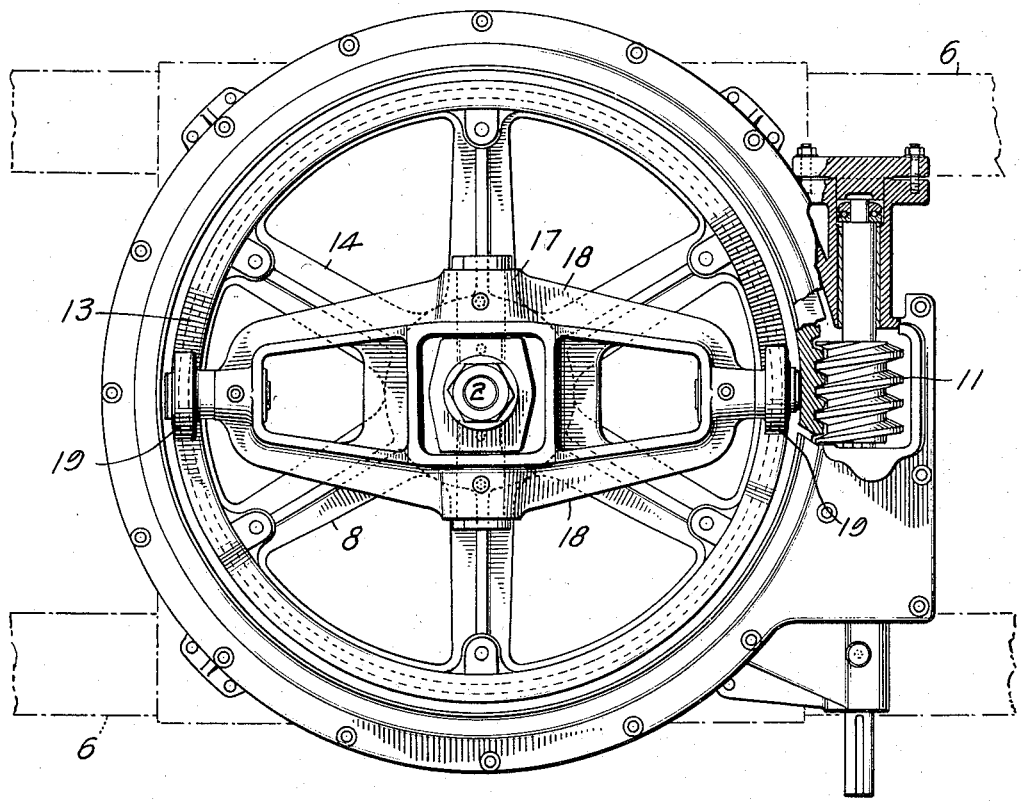
Figure 3 is a plan view of the mechanism shown in Figure 2.

Referring to Figure 1 of the drawings, the sedimentation tank 1 having an inlet pipe 1a is provided with a vertical shaft 2 upon which are mounted the rake arms 3 carrying the blades 4. These blades are arranged in spaced relation on the arms 3 and are inclined with respect thereto in a manner well understood in the art so that upon the slow revolution of the arms, the settled solids in the tank are progressively displaced towards a central outlet sump 5 from which they are withdrawn through a valve 5a. The supernatant liquid overflows into a launder 5b. Extending across the upper part of the tank are a pair of spaced main beams 6 carrying transverse beams 6a upon which is mounted a bearing structure 7 for the shaft 2. The beams 6 also carry a motor 7a for driving the shaft 2 through suitable gearing.

Figure 2:
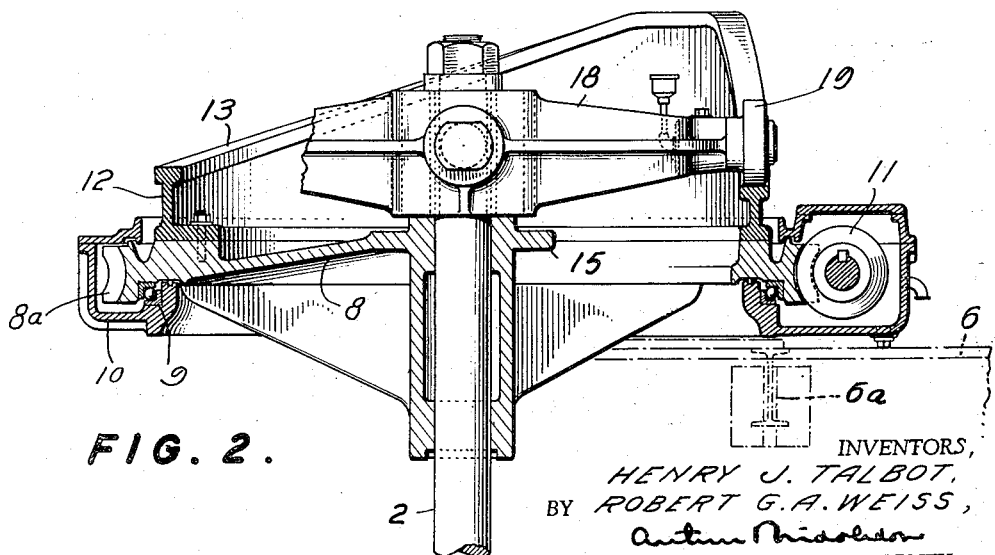
Figure 2 is an elevation partly in section showing the supporting and driving mechanism for the revolving rakes.

One form of the supporting and driving mechanism for the rake shaft is illustrated in Figures 2 and 3 of the drawings. A horizontal gear wheel 8 is supported on bearings 9 which are arranged within a closed gear casing 10 carried by the transverse beams 6a. A worm 11 meshes with the gear wheel 8 and is connected to the driving motor 7a as shown in Figure 1. The driving and lifting cam structure 12 is mounted upon the upper face of the gear wheel 8. The upper enlarged edge 13 of the cam structure is circular in plan as will be seen from Figure 3 and comprises a pair of humps diametrically disposed. The wheel 8 has six arms 14 which extend inwardly to a central boss 15 having a downward extension 16 serving as a guide within which the rake shaft 2 is freely rotatable and is also slidable in an axial direction. The upper end of the shaft 2 is provided with a pair of trunnions 17 upon which is pivotally mounted a double-armed spider 18 at the outer ends of which are carried rollers 19 disposed to run on the humped cam surface 13.

Referring to Figure 4 which is a developed view of the cam it will be seen that the cam humps are provided with driving and lifting surfaces 20 and the slope of these is preferably made to correspond with the maximum permissible torque of the driving shaft. The driving slope 20 merges smoothly, as by means of a radius as shown, into a substantially horizontal portion 21, and this again merges smoothly into a gentle backward or lowering slope 22 which joins up smoothly with the rising or driving slope as indicated at 23. From that which has preceded it will be noted that the cam or cam construction extends upwardly and provides a continuous track or supporting surface having in serial arrangement a plurality of elevated and depressed portions typified by the driving and lifting surfaces 20 terminating in the crest of elevated horizontal portions 21 and the receding or lowering slopes 22 which merge into the depressed sections or lowermost dwells leading to the initial portion 23 of the rising sections or lifting surfaces 20. It will be understood that the rake mechanism which includes the rake arms 3, the shaft 2 and the spider 18, is suspended from the cam structure carried by the gear wheel 8. As the latter is revolved in a clockwise direction with reference to Figures 3 and 4, the rollers 19 on the spider will commence to ride up the driving slopes 20 of the cam when the load on the rakes corresponds to the maximum value for which the slopes are designed. The rakes will continue to rise until they reach a region where the resistance is less than that corresponding to the slope 20 and will continue to operate at this level. The slope 20 being a constant one as illustrated, a continuous rise will only occur if the level of solids causing the maximum torque also rises, or if the resistance to the motion of the rakes is increased in any way whatever as for example by increased density of sludge or by some obstruction or other in the tank. When in such circumstances the rollers reach the tops of the driving slopes 20 they will pass over the horizontal portions 21 and on to the backward slopes 22, at which point the rakes will commence to descend under their own weight. The gradual transition or radius between the constant driving slope 20 and the horizontal portion 21 will make for a smooth change-over and also makes it possible to rake off the top of the sludge under light load in certain circumstances.

It will be understood that the arrangement desired affords a certain amount of storage for settled solids within the limits of vertical movement of the rakes, and the lift may be increased by making the cam humps higher if more storage is required. The inclination of the cam slopes may obviously be widely varied to suit particular operating conditions, and if desired the driving slopes may progressively increase. Furthermore, the horizontal portion of the cam may be omitted if desired. By reason of the fact that the driving surface is continuous and the driving slope decreases to zero when the lift exceeds a given amount, it is impossible in ordinary circumstances for the transmitted torque to exceed a value determined by the inclination of the driving slope. Thus the provision of electrical overload devices on the driving motor, which are always liable to be tampered with by the operator, are rendered unnecessary. Under exceptional condititons, however, it is possible for an excessive resistance to rake movement to be developed even with the arrangement described above, and means for dealing with such conditions are described hereinafter.

The pivotal arrangement of the spider 18 described above ensures an equal distribution of the driving torque on both of the rollers. For this reason the cam surfaces 13 may be left unmachined so that the cost of manufacture of the mechanism is reduced.

The driving mechanism may be modified if desired by providing a spider with three roller carrying arms supported on a cam having three humps. With such an arrangement it is necessary to provide a pivotal connection between the spider and the shaft affording adjustment movement about two axes at right-angles.

Figure 7:
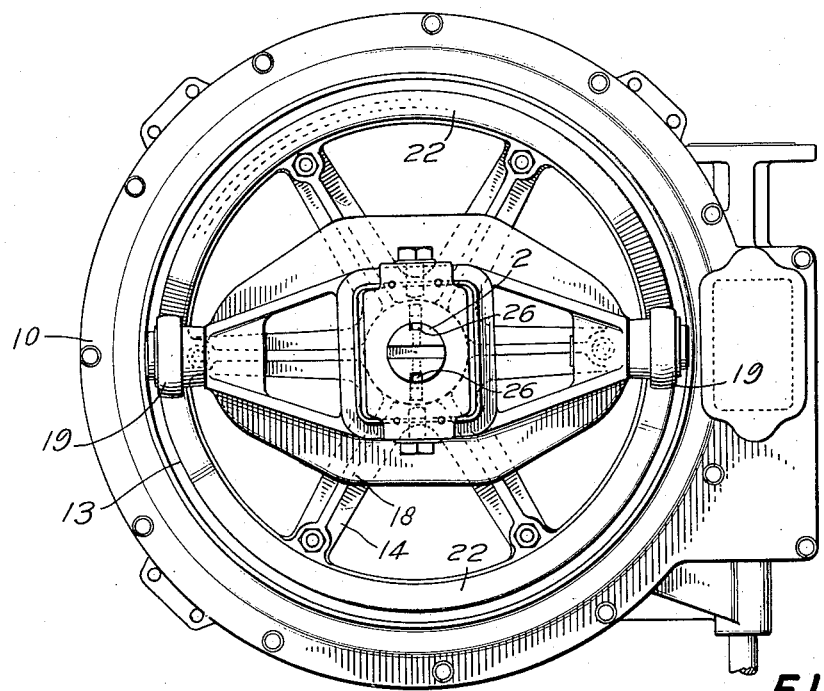
Figure 7 is a plan view of the mechanism shown in Figure 5.
Figure 6:
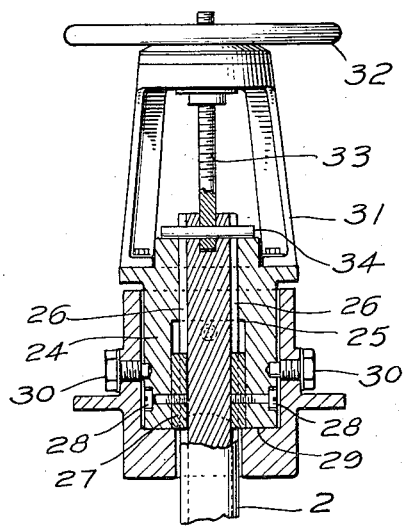
Figure 6 is a section on the line 6—6 of Figure 5.

A modified form of driving mechanism is illustrated in Figures 5, 6 and 7, similar parts being indicated by the same reference numerals. The main difference between this arrangement and that previously described lies in the method of connection between the rake shaft 2 and the roller carrying spider 18. A sleeve 24 is secured to the upper end of the shaft and this sleeve is provided with two oppositely disposed and downwardly directed side portions 25 the lower ends of which are formed as semi-cylindrical bearing surfaces. The shaft 2 has a pair of long keyways 26 with which are engaged keys 27 secured to the side portions 25 by bolts 28. The bearing surfaces of these side portions rest in trough-shaped recesses 29 provided in the spider 18 and centred by means of bolts 30. In this way provision is made for the pivotal movement of the spider arms and hence the cam surfaces need not be finished with extreme accuracy.

The arrangement is provided with a hand lifting device comprising a frame 31 secured to the spider 18 carrying a hand wheel 32 on which is mounted a nut meshing with a threaded spindle 33 secured to the upper end of the rake shaft 2 by means of a pin 34 which rests upon the sleeve 24 when the spindle is in its lowermost position in the nut. This allows the shaft to be drawn upwardly by operating the hand wheel 32 independently of the cam driving mechanism.

As in the previous example, if the load on the rakes is such that the maximum lift is attained, the rollers will ride over the tops of the cam humps and attempt to descend on the reverse slopes. Owing to the accumulation of solids the rakes may not descend sufficiently rapidly and the rollers will then leave the cams, the rakes remaining more or less stationary until the rollers are picked up again by the driving slopes of the cam on the continued rotation thereof.

Figure 8:
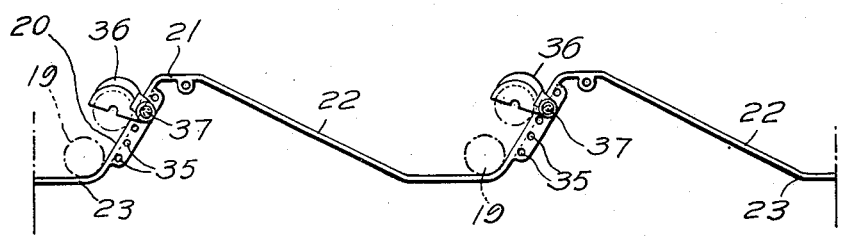
Figure 8 is a diagram showing the development of the driving cam including a detachable means for arresting the upward movement of the rakes.

Referring to Figure 8 it will be seen that adjacent the driving slope 20 of the cam structure there are provided a series of regularly spaced holes 35 which allow a stop shoe 36 to be secured therein by means of a bolt 37 at any of the corresponding positions on the slope. The provision of the stop shoe allows the upward movement of the rakes to be arrested at any desired point for the purpose of clearing an overload, such as may be caused by an excessive accumulation of sludge in the tank. These stop shoes may also be employed in conjunction with the hand lifting device previously described for the purpose of reducing an overload by forcing the rakes further down into the sludge bed. In order to accomplish this the stop shoes are fixed in position and the hand wheel 32 is operated in a direction to move the rake shaft 2 downwardly, the resultant upward thrust being taken by the shoes and transmitted through the cam structure and the cover of the gear casing to the supporting structure. By lowering the rakes gradually in this way the excess of solid material in the tank may be removed and the mechanism will then automatically take up a position lower down the driving cam slope. If desired the stop shoes can then be removed and replaced in a lower hole and the operation repeated until the overload has been entirely removed. In some cases the overload may be relieved by alternately raising and lowering the rakes by use of the hand lifting gear.

It will be understood that the normal arrangement of the drive through the continuous humped cam structure constitutes in effect an overload protection for the driving motor, since an undue increase in the amount of sludge in the tank will bring the rake arms to their uppermost position where they are no longer driven by the cam. Thus in many cases the use of an overload cut-out of the motor may be obviated. This arrangement is particularly suitable for belt driven thickeners. While the arrangement will function as an overload protection in most circumstances, conditions may arise in which the rakes may become buried in heavy material and thus may be unable to rise without throwing a possibly dangerous torque on the drive mechanism. To provide a safeguard against overstraining or breakage in such circumstances a mechanical overload device may be provided.

Figure 9:
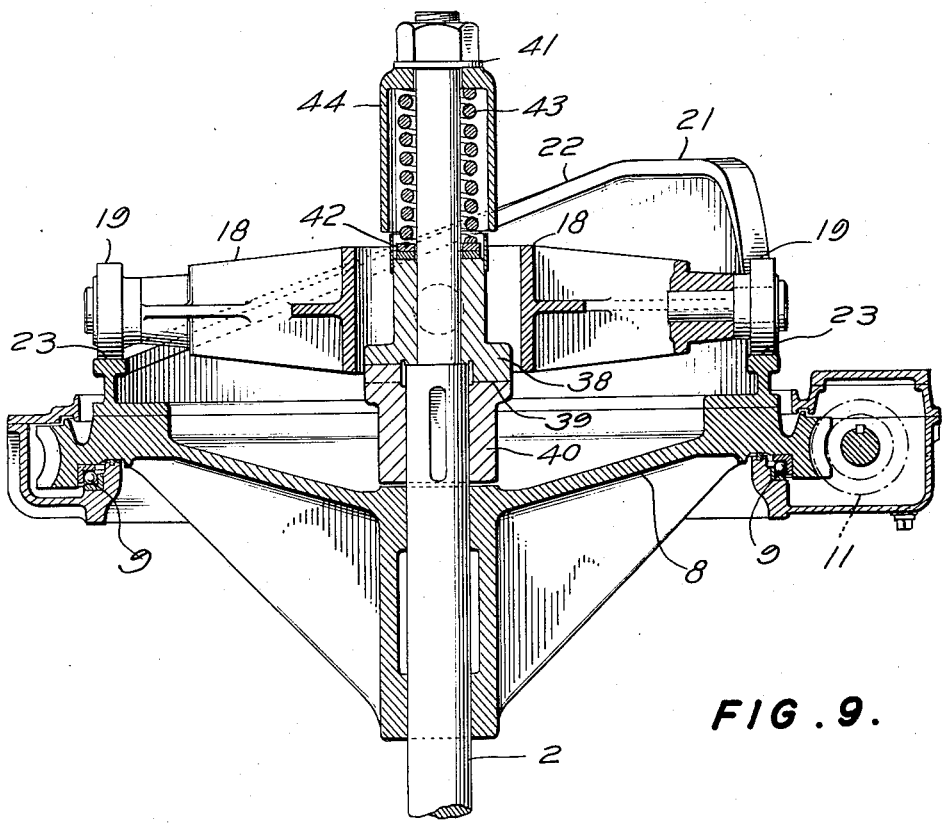
Figure 9 is an elevation partly in section of a modified form of supporting and driving mechanism for the rakes including a mechanical overload release.
Figure 10:
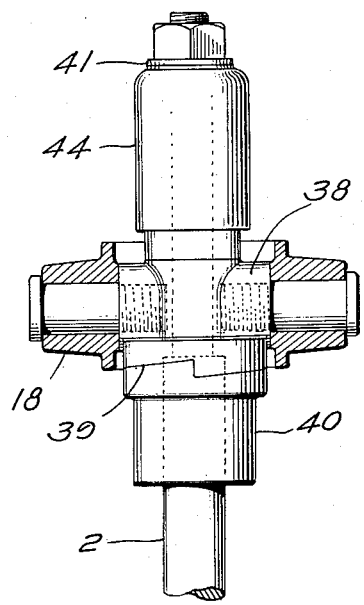
Figure 10 is a section taken on the line 10—10 of Figure 9.

Referring to Figures 9 and 10 of the drawings the horizontal gear wheel 8 is driven from the worm 11 and carries the continuous humped cam structure 12 as previously described. The spider 18, upon which the rollers 19 are mounted, is secured to a hollow member 38 which is free on the rake shaft 2 and is formed with interrupted surfaces 39 constituting one half of a clutch. A second member 40 keyed to the shaft has similar interrupted surfaces and constitutes the co-operating second half of the clutch, which half lies below the upper half 38. The co-operating clutch surfaces are inclined to a plane perpendicular to the axis of the shaft. At the upper end of the shaft 2 is secured a collar 41 and between this collar and bearing members 42 resting on the upper end of the clutch half 38, there is interposed a heavy spring 43. The collar 41 is provided with a skirt 44 forming an enclosure for a spring, which latter is adapted to carry the whole of the weight of the rake shaft and its attached rake mechanism. Should the upward thrust developed by the spider 18 exceed the maximum for which the mechanism is designed, the spring 43 will be compressed and thus allow the clutch parts 38 and 40 to separate by relative sliding movement of the inclined surfaces and interrupt the drive. Such mechanical overload protection may replace the usual electrical cut-out associated with the driving motor and has the advantage of not being so readily tampered with.

Figure 12:
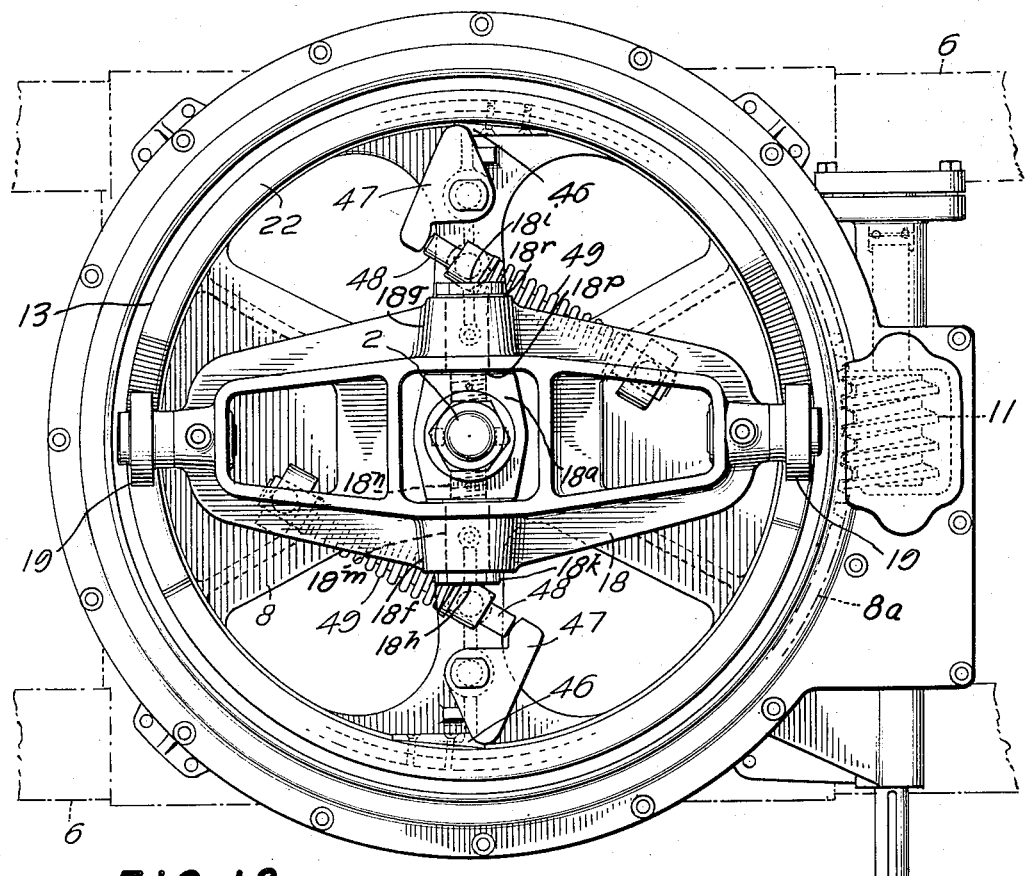
Figure 12 is a section taken on the line 12—12 of Figure 11.
Figure 11:
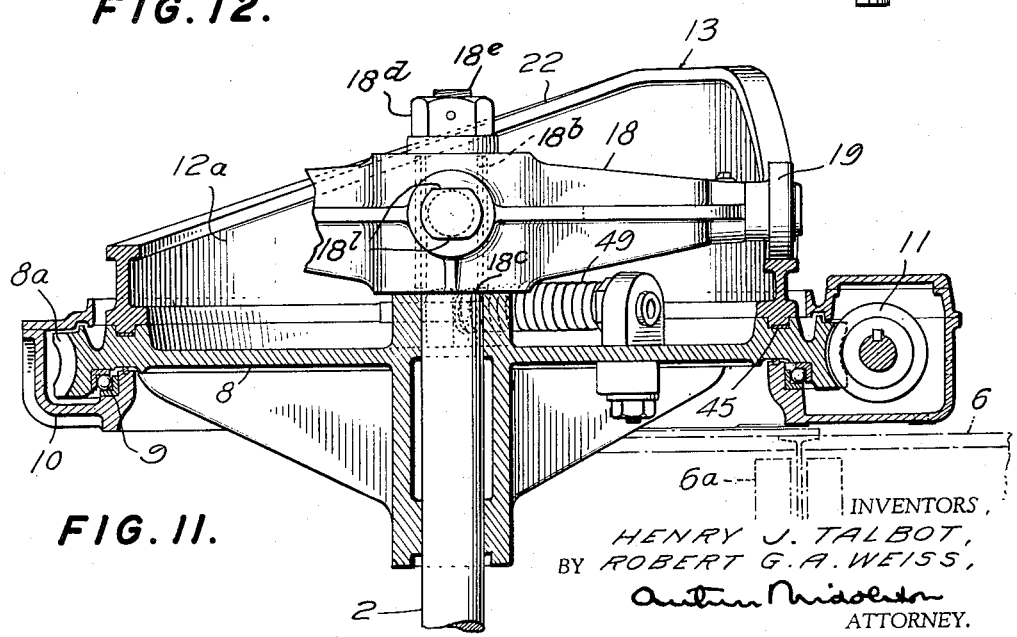
Figure 11 is a sectional elevation of another form of supporting and driving mechanism for the rakes including a modified form of mechanical overload release.

As an alternative to the mechanical overload protection described above there may be provided a device which interrupts the drive when the transmission torque exceeds the predetermined value, irrespective of the value of the upward pull on the rakes. Such a device is shown in Figures 11 and 12. The vertical shaft 2 carrying the sediment collecting rakes is pivotally connected to the spider 18 on which are mounted the rollers 19 running on the continuous humped cam as previously described. There is provided a pivotal connection between the shaft 2 and the spider or cam engaging element 18 comprising a head member 18a fitted over the reduced upper end portion 18b of the shaft 2. This reduced portion forms a shoulder 18c upon which the head member 18a is secured by means of a nut 18d screwed on to the threaded extreme upper end portion 18e of the shaft 2. The spider or cam engaging element 18 is shown to be in the form of a frame-like element that surrounds the head member 18a, and has oppositely arranged lateral hub portions 18f and 18g into which fit a pair of coaxial pivot members 18h and 18i, respectively, which extend horizontally from the head member 18a. Each pivot member has a head portion 18k provided with flat faces 18l, a cylindrical intermediate portion 18m that fits the bore of the lateral hub portions 18f or 18g respectively, and is rotatable therein, and a threaded end portion 18n that screws into the head member 18a. The threaded portion 18n is reduced to form with the cylindrical portion 18m a shoulder 18p, thereby providing for suitable axial clearances 18r between the members constituting the pivotal connection, so as to permit unhampered rotary motion of the pivot members 18h and 18i in the member 18. A similar pivotal connection has been shown to exist between the shaft 2 and the spider 18 according to the embodiment shown in Figs. 2 and 3, and in Figures 9 and 10, Figure 10 in particular being a cross-section exposing more clearly the pivot members as screwed into the head member 18a of the shaft 2. It will be noted with respect to the pivotal connection just described between the track engaging member or spider 18 and the vertical shaft 2, that it provides a pivotal support of the vertical shaft 2 upon the cam engaging member 18, whereby the member 18 is allowed to move angularly about the horizontal pivotal axis. In other words, this permits of sufficient pivotal movement of the member 18 about an axis perpendicular to the vertical shaft 2, so as to compensate for any inequalities of the track represented by the cam construction or cam structure 12. This enables the member 18 to adjust itself by vertical angular movement to the supporting track and thereby to distribute the load or driving power uniformly to both ends of the cam engaging member 18, that is to say, uniformly to both cam engaging rollers 19 provided at the respective ends of the member 18. The horizontal gear wheel 8a driven from the worm 11 is provided with a slot or annular groove 45 in which the cam structure 12a is rotatably seated. A pair of shallow projections formed by attached shoes 46 are provided within the cam structure and these are engaged by fingers 47 pivotally mounted on the spokes of the gear wheel. These fingers are normally held into engagement with the said projections by spring-pressed rods 48 also mounted on the wheel, the springs being indicated at 49. The strength of these springs is such that in normal conditions of loading in the tank, the cam structure is driven round by the gear wheel through the engagement of the fingers 47 with the projections 46. Should the designed torque be exceeded the springs 49 are compressed, causing the fingers 47 to rotate on their pivots and pass over the projections 46 thereby interrupting the drive. When the cam structure is thus released the gear wheel will continue to rotate leaving the projections 46 behind either stationary or rotating at a relatively slower speed until again picked up by the fingers. Thus the automatic release or interruption of the drive may take place at any position of the rakes within the limits of the vertical lift provided. The operation of the apparatus is otherwise as described in connection with the previous examples.

Figure 13:
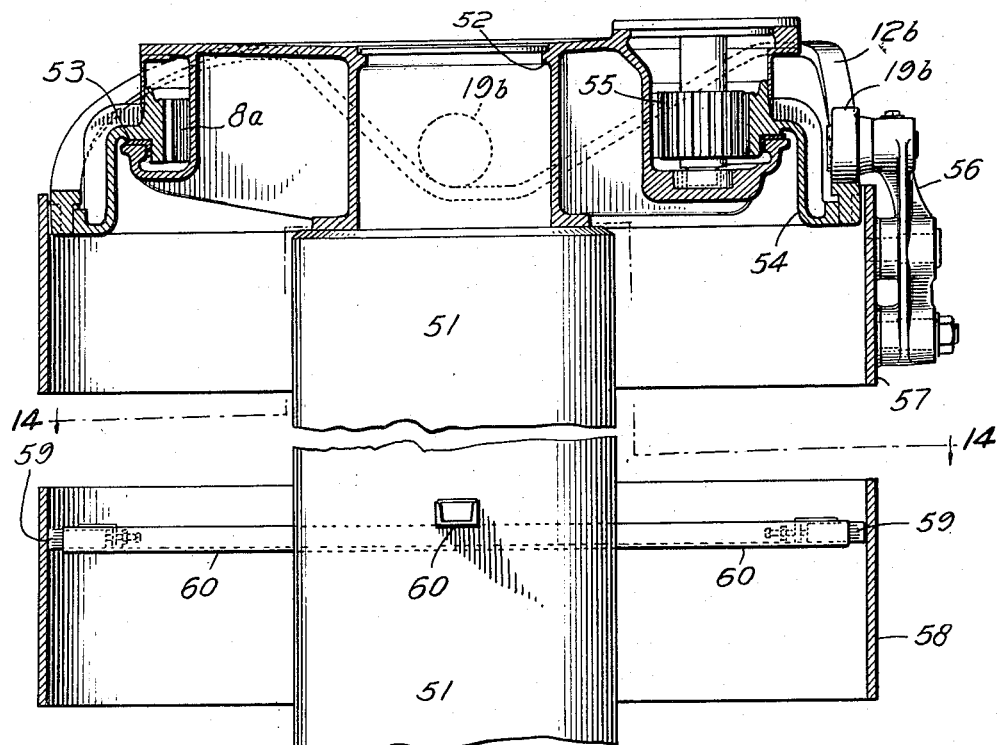
Figure 13 is an elevation partly in section of a modified form of supporting and driving mechanism for the rakes applied to a sedimentation tank having a central pier on which the rotatable rake mechanism is suspended.

While in the examples described above the rakes are carried by a vertical shaft, the invention is equally applicable to sedimentation apparatus having a central pier from which the rotatable rake mechanism is suspended. An apparatus of this character is illustrated in Figures 13 and 14. The rakes (not shown) are carried by a cage structure of known general form comprising vertical angle members 50, which surrounds the central pier 51 upstanding from the tank bottom. Upon the upper end of the pier is supported a framework 52 provided with an annular bearing 53 upon which is rotatably mounted a gear ring 54 meshing with a driving pinion 55. The driving motor and reduction gearing (not shown) is carried on a platform supported on the framework 52. A continuous humped cam element 12b, similar to the cam element described in connection with the previous examples, is mounted on the gear ring 54. The cage carrying the rakes is suspended from the cam structure by means of rollers 19b which are attached to links 56 secured to the cage.

In order to prevent tilting of the cage during the operation of the apparatus there are provided a pair of cylindrical elements which function as guides. One of these cylindrical guides is shown at 57 and is secured to the upper end of the cage and has a depth somewhat greater than the maximum height of the cam structure 12b. A second cylindrical guide 58 is provided at the lower end of the cage and is arranged to be engaged when the cage is tilted by means of hard wood blocks 59 or other bearing members mounted in radial arms 60 secured to the central pier 51. In order to enable the machining of the cam surfaces to be eliminated the links 56 carrying the rollers 19b are arranged to be adjustable with respect to the cage. The operation of the mechanism is otherwise the same as that of the construction described with reference to Figure 1, and hence need not be repeated.

Figure 15:
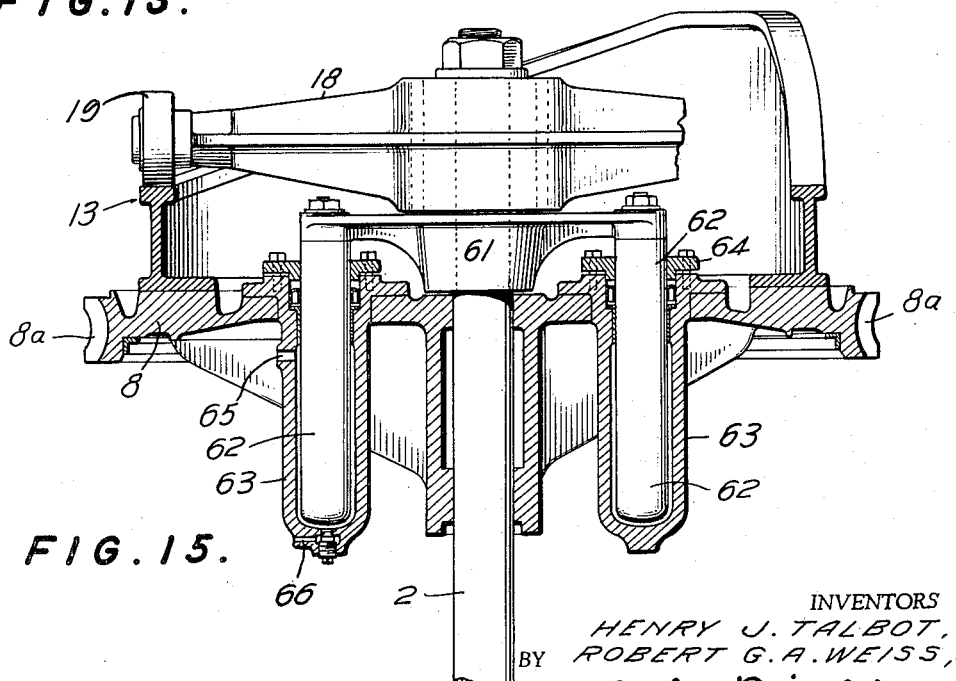
Figure 15 is an elevation partly in section of a modified form of mechanism for supporting and driving the rakes including means for retarding or cushioning the descent of the mechanism.

It will be understood that in the operation of the various forms of sedimentation apparatus previously described an overloading of the apparatus and consequent lifting of the rakes would be caused by an accumulation of thick sludge in the tank, and that as the overload is cleared the presence of such thick sludge would automatically retard the downward movement of the rakes, and thus ensure smooth working of the apparatus. It might happen, however, that the rake mechanism would be lifted owing to the presence of a foreign body of considerable size in a relatively thin sludge, and in such circumstances the rakes might be lowered too rapidly after the removal of the body and thus cause an overstressing and possible breakage of the mechanism. In order to avoid such an eventuality, there may be provided in accordance with the invention a cushioning device between the spider carrying the rollers and the driving gear. One form of device adapted for this purpose is illustrated in Figure 15. The rake shaft 2 carrying the spider 18 with rollers 19 running on a cam structure 12 is arranged as in previous examples, but there is also provided an additional spider 61 secured to the shaft 2 and movable therewith. The auxiliary spider comprises a pair of arms to which are attached vertical rams 62 working in cylinders 63 mounted on the horizontal gear wheel 8. Suitable glands 64 are provided for closing the upper ends of the cylinders which are supplied with operating fluid under pressure through a connection 65. At the lower end of each cylinder is a small leak-off orifice 66 and in the event of the rollers 19 attempting to run down the cam slopes too fast, the operating fluid is forced through the leak orifice and thus retards the rate of lowering of the rake mechanism. It will be understood that this cushioning device may be applied if desired to any of the constructions previously described.

In order to assist in clearing excessive accumulations of sludge the rake blades may, in accordance with the invention, be made triangular in section so that when the blades sink back into the sludge as the rollers 19 pass on to the lowering cam surface, the blades are given a forward movement. A rake blade of this construction is shown in Figure 16 in which 67 illustrates a part of the rake carrying arm. The rake blade itself consists of an angle member 68 secured to the rake arm in any convenient way as for example by welding, and an inclined member 69 which closes the open angle of the member 68, and may also be secured in place by welding. In this way there is provided a blade which has an upwardly and a rearwardly inclined surface and the section of the blade exhibits a downwardly directed point. Thus when the rake structure is allowed to sink freely into the accumulated sludge, the inclined surfaces represented by the rear member 69 will cause a forward movement of the blade and hence of the arm in the direction of the general desired movement of the rake structure, and this movement will of itself assist in the disposal of the accumulated sludge. Rake blades of this construction may be employed in any of the forms of sedimentation tank previously described.

The sedimentation tank will usually be provided with a conical discharge outlet or sump as indicated in Figure 1 in which operates a cone-shaped scraper attached to the rake shaft. Where it is desired that the scraper should be operative over the whole of the lift the outlet is extended by the addition of upper and lower cylindrical portions. A discharge outlet of this kind is illustrated in Figure 17, where the sump comprises a conical portion 70, an upper cylindrical portion 71 and a lower cylindrical portion 72. The depth of the portions 71 and 72 is substantially equal to or greater than the amount of lift which is provided by the continuous humped cam surface. A scraper is secured to the rake shaft and consists of bent strip members 73 which are shaped to conform with the vertical cross section of the sump. When the rakes are operating in their normal position the scrapers will occupy the full line position shown in Figure 17, and when the rakes are raised they will occupy the position shown in the dotted lines. It will thus be seen that at all vertical positions of the rakes a portion of the scraper will always be operative within the discharge outlet sump, and thus possibility of the outlet becoming completely clogged is obviated. A discharge or outlet sump and scraper arrangement of this form may be employed in conjunction with any of the forms of sedimentation apparatus previously described, and also with other forms having means for raising and lowering the rakes or other revolving devices. Thus this feature of the invention is not limited in its application to devices employing a humped or continuous driving and lifting cam arrangement for the revolving devices.

It will be understood that while the invention has been described as applied to sedimentation apparatus employing rakes for displacing settled solids towards a discharge it is also applicable to other types of apparatus in which revolving devices are employed to act upon a liquid-solids mixture, as for example in stirring apparatus.

We claim:
1. Settling apparatus having a settling tank and load responsive sludge coveying means therefor comprising a rotary driven vertical member carrying sludge impelling elements operating in said tank, an annular member substantially concentric with said vertical member and provided with an upwardly extending cam construction presenting a similarly concentric cam surface providing a continuous track having in serial arrangement a plurality of elevated and depressed portions, and means for cooperatively engaging said track, said annular member and said track engaging means coacting to transmit driving torque to said vertical member and adapted to lift said vertical member in response to torque reaction from overload on the sludge impelling elements because of said cam engaging means being adapted to move relatively over and past the elevated portions of said track in response to said overload.

2. Apparatus according to claim 1, in which the rotary vertical member is surrounded by and guided concentrically with respect to the annular member, and in which the track engaging means comprise a track engaging member the end portions of which are operatively supported by said track to receive driving torque therefrom, and a pivotal connection provided intermediate said end portions of the track engaging member and connecting the intermediate portion of the member with said vertical member, and effective to permit angular motion of said track engaging member with respect to the vertical member to insure vertical load distribution from said vertical member to said end portions of the track engaging member and to corresponding points of the track engaged thereby.

3. Settling apparatus having a settling tank and a load responsive sludge conveying means therefor comprising a driven vertical member carrying sludge impelling elements operating in said tank, an annular driving member surrounding said vertical member and operating substantially concentric therewith, a marginally extending cam construction associated therewith and providing a continuous track having in serial arrangement a plurality of upwardly extending elevated portions and depressed portions, a cam engaging element the end portions of which are operatively supported by said track to receive driving torque therefrom, and a pivotal connection provided intermediate said end portions of the cam engaging element and connecting the intermediate portion of said element with said vertical member and effective to permit angular motion of said cam engaging member with respect to the vertical member to insure vertical load distribution from said vertical member to said end portion of the cam engaging element and to corresponding points of the track engaged thereby, said cam engaging element being adapted to lift the vertical member when the cam engaging element is forced upwardly by said cam construction due to torque reaction from overload on the sludge impelling elements.

4. Settling apparatus having a settling tank, and load responsive sludge conveying means therefor comprising a driven vertical member carrying sludge impelling elements operating in said tank, an annular driving member surrounding said vertical member and operating substantially concentric therewith, a cam construction extending along a circle upon said annular driving member and rotating coaxially therewith, and providing a plurality of upwardly inclined consecutive track portions, a cam engaging element the end portions of which are operatively supported by said track portions to receive driving torque therefrom, and a pivotal connection provided intermediate said end portions of the cam engaging element and connecting the intermediate portion of said element with said vertical member and comprising a pair of pivot members having a horizontally extending longitudinal axis operatively connecting the cam engaging element with the vertical member, for transmitting driving torque from the cam engaging element to the vertical member, and for permitting said cam engaging element to perform angular motion about the horizontal pivotal axis, and with respect to the vertical member, to insure load distribution from said vertical member to said end portions of the cam engaging element and to the corresponding points of the track portions engaged thereby, said cam engaging element being adapted to lift the vertical member when the cam engaging element is forced upwardly along said upwardly inclined track portion by said cam construction due to torque reaction from overload on the sludge impelling elements.

5. Settling apparatus having a settling tank, and load responsive sludge conveying means therefor comprising a driven vertical member carrying sludge impelling elements operating in said tank, an annular driving member surrounding said vertical member and operating substantially concentric therewith, a marginally extending cam construction associated therewith and providing a plurality of upwardly inclined consecutive track portions, a cam engaging element having its end portions operatively supported by said track to receive driving torque therefrom, and a pivotal connection operatively connecting the intermediate portion of said cam engaging element with said vertical member, said connection comprising a head member fixed to the upper end portion of said vertical member and surrounded by the intermediate portion of the cam engaging element, and a pair of pivotal members, each of which is screwed into said head member and has a cylindrical portion having rotatable bearing engagement with the adjacent portion of the surrounding cam engaging element, for transmitting driving torque from the cam engaging element to the vertical member, and for permitting angular motion about the pivotal axis of said cam engaging element with respect to the vertical member to insure load distribution from said vertical member to said end portions of the cam engaging element and to the corresponding points of the cam construction engaged thereby, said cam engaging element being adapted to lift the vertical member when the cam engaging element is forced upwardly by said cam construction, due to torque reaction from overload on the sludge impelling elements.

ROBERT GEORGE ALBERT WEISS.
HENRY JOHN TALBOT.